United States Patent
Kim et al.

(10) Patent No.: US 9,154,922 B2
(45) Date of Patent: Oct. 6, 2015

(54) MULTICAST MANAGEMENT METHOD AND APPARATUS

(75) Inventors: Eunkyung Kim, Daejeon (KR); Sung Cheol Chang, Daejeon (KR); Sung Kyung Kim, Daejeon (KR); Hyun Lee, Daejeon (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 13/811,947

(22) PCT Filed: Jul. 25, 2011

(86) PCT No.: PCT/KR2011/005463
§ 371 (c)(1),
(2), (4) Date: Jan. 24, 2013

(87) PCT Pub. No.: WO2012/015204
PCT Pub. Date: Feb. 2, 2012

(65) Prior Publication Data
US 2013/0121236 A1    May 16, 2013

(30) Foreign Application Priority Data

Jul. 27, 2010  (KR) .......... 10-2010-0072376
Mar. 4, 2011   (KR) .......... 10-2011-0019624
Jul. 19, 2011  (KR) .......... 10-2011-0071608

(51) Int. Cl.
H04L 1/06  (2006.01)
H04W 4/06  (2009.01)
H04L 1/00  (2006.01)

(52) U.S. Cl.
CPC .............. *H04W 4/06* (2013.01); *H04L 1/0029* (2013.01); *H04L 1/0072* (2013.01); *H04L 1/0061* (2013.01); *H04L 2001/0093* (2013.01)

(58) Field of Classification Search
CPC ... H04L 1/0029; H04L 1/0061; H04L 1/0072; H04L 2001/0093; H04W 4/06
See application file for complete search history.

(56) References Cited

U.S. PATENT DOCUMENTS 7,970,906 B2     6/2011  Oh et al.
2007/0130362 A1*  6/2007  Oommen et al. ............. 709/238
2007/0253367 A1  11/2007  Dang et al.

(Continued)

FOREIGN PATENT DOCUMENTS

KR   10-2008-0039616 A    5/2008

OTHER PUBLICATIONS

Lei Huang et al., "Clean-up on CRC Mask for Assignment A-MAP IE in P802.16m/D5 (16.3.6)", IEEE 802.16 Broadband Wireless Access Working Group, IEEE C802.16m-10/0502r1, May 11, 2010.

(Continued)

*Primary Examiner* — Chi H Pham
*Assistant Examiner* — Raul Rivas
(74) *Attorney, Agent, or Firm* — Rabin & Berdo, P.C.

(57) ABSTRACT

A multicast management method of a base station is provided. The base station generates a CRC for a message including resource allocation information of a multicast group including a plurality of terminals, and masks the CRC by a CRC mask. The base station adds the masked CRC to the message, and then transmits the message to which the masked CRC is added to the multicast group.

7 Claims, 11 Drawing Sheets

(56) References Cited

U.S. PATENT DOCUMENTS

| | | |
|---|---|---|
| 2008/0101269 A1 | 5/2008 | Jung et al. |
| 2009/0043895 A1 | 2/2009 | Oh et al. |
| 2009/0103487 A1 | 4/2009 | Oh et al. |
| 2009/0238106 A1* | 9/2009 | Ulupinar et al. ............ 370/312 |
| 2010/0251083 A1* | 9/2010 | Cho et al. ................... 714/807 |
| 2011/0170480 A1* | 7/2011 | Pi et al. ...................... 370/328 |

OTHER PUBLICATIONS

Seho Kim et al., "Proposed text for multicast operation in IEEE 802.16m", IEEE 802.16 Broadband Wireless Access Working Group, IEEE C802.16m-10/0805r2, May 11, 2010.

Yu-Hao Chang et al., "Multicast A-A-MAP Symbols Mapping Scheme in 802.16m systems (16.3.6)", IEEE 802.16 Broadband Wireless Access Working Group, IEEE C802.16m-10/0218, May 11, 2010.

* cited by examiner

MULTICAST MANAGEMENT METHOD AND APPARATUS

TECHNICAL FIELD

The present invention relates to a multicast management method and apparatus.

BACKGROUND ART

In a conventional communication system, data transmission between a base station and a terminal or between a relay station and a terminal is performed in unicast, multicast, and broadcast manner. Multicast and broadcast transmissions are defined mainly in a multicast and broadcast service (MBS) region. Although various data transmission methods are defined in a non-MBS region, an efficient multicast transmission is not sufficiently defined.

A group call may be used in a communication system. For example, a group call may be preferred in a communication method of a command and control system for public protection and disaster relief. Among the transmission methods, multicast transmission may be applied to the group call. In a conventional communication system, however, there is a restriction in the use of a multicast-based group call, especially in a non-MBS region, and accordingly the definition of a multicast transmission method is required.

DISCLOSURE

Technical Problem

Embodiments of the present invention provide a multicast management method and apparatus for performing efficient multicast transmission.

Technical Solution

An embodiment of the present invention provides a method of managing a multicast by a base station. The method includes generating a cyclic redundancy check (CRC) for a message including resource allocation information of a multicast group including a plurality of terminals; masking the CRC by a CRC mask, adding the masked CRC to the message, and transmitting the message to which the masked CRC is added to the multicast group.

The method may further include generating the CRC mask using a multicast group identifier (MGID).

Some bits of the CRC mask may include the MGID. Alternatively, some bits of the CRC mask may include some bits of the MGID.

The method may further include generating the CRC mask using a multicast group connection identifier (MGCID) of the multicast group.

The MGCID may be a combination of a multicast group identifier and a flow identifier for identifying a flow within the multicast group.

The method may further include transmitting a signaling message for managing the multicast group to each terminal of the multicast group in unicast.

The signal message may include an MGID.

The signaling message may include at least one of an addition, a change, and a deletion of the multicast group.

The method may further include receiving a response message for the signaling message from each terminal.

The method may further include receiving a request message for the signaling message from each terminal. In this case, the signaling message may be a response message to the request message.

The method may further include transmitting a signaling message for managing a flow in the multicast group to the plurality of terminals of the multicast group in multicast.

The signaling message may include a flow identifier.

The signaling message may be transmitted through a resource allocated to the multicast group.

The method may further include transmitting a signaling message for managing a multicast group connection of the multicast group to each terminal of the multicast group in a unicast fashion.

The signaling message may include a multicast group connection identifier.

An embodiment of the present invention provides a method of managing a multicast by a terminal. The method may include receiving a message including resource allocation information associated with the multicast group to which the terminal belongs, and identifying the message by a CRC mask.

The message may include a CRC masked by the CRC mask.

The resource allocation information may be the resource allocation information of the multicast group, and the CRC mask may be generated by a multicast group identifier (MGID).

Alternatively, the resource allocation information may be the resource allocation information of a multicast group connection of the multicast group, and the CRC mask may be generated by a multicast group connection identifier (MG-CID).

The MGCID may be a combination of a multicast group identifier and a flow identifier for identifying a flow within the multicast group.

The method may further include receiving a signaling message for managing the multicast group from the base station in unicast.

The signaling message may include a multicast group identifier.

The method may further include receiving a signaling message for managing a flow in the multicast group from the base station in multicast.

The signaling message may include a flow identifier.

The method may further include receiving a signaling message for managing a multicast group connection of the multicast group from the base station in unicast.

The signaling message may include a multicast group connection identifier.

Another embodiment of the present invention provides a multicast management apparatus. The multicast management apparatus includes a multicast group manager configured to manage a multicast group including a plurality of terminals, a CRC processor configured to mask a CRC for a message including resource allocation information of the multicast group by a CRC mask, and a transceiver configured to transmit the message to which the masked CRC is added to the multicast group.

The CRC processor may generate the CRC mask using a multicast group identifier (MGID).

The CRC processor may generate the CRC mask using a multicast group connection identifier (MGCID) of the multicast group.

Another embodiment of the present invention provides a multicast management apparatus for a terminal. The multicast management apparatus includes a CRC processor configured to process a CRC mask, and a transceiver configured to receive a message including resource allocation information associated with the multicast group to which the terminal belongs from the base station and to identify the message by the CRC mask.

The CRC mask may be generated by using a multicast group identifier (MGID).

The CRC mask may be generated by using a multicast group connection identifier (MGCID) of the multicast group.

Advantageous Effects

According to an embodiment of the present invention, a group call can be performed in zones other than an MBS zone because terminals belonging to the same group can receive traffic in multicast.

According to another embodiment of the present invention, resources can be allocated for each multicast group or each multicast group connection because a multicast group or multicast group connection can be identified by a CRC mask generated using a multicast group identifier or multicast group connection identifier.

MODE FOR INVENTION

Figure 1:
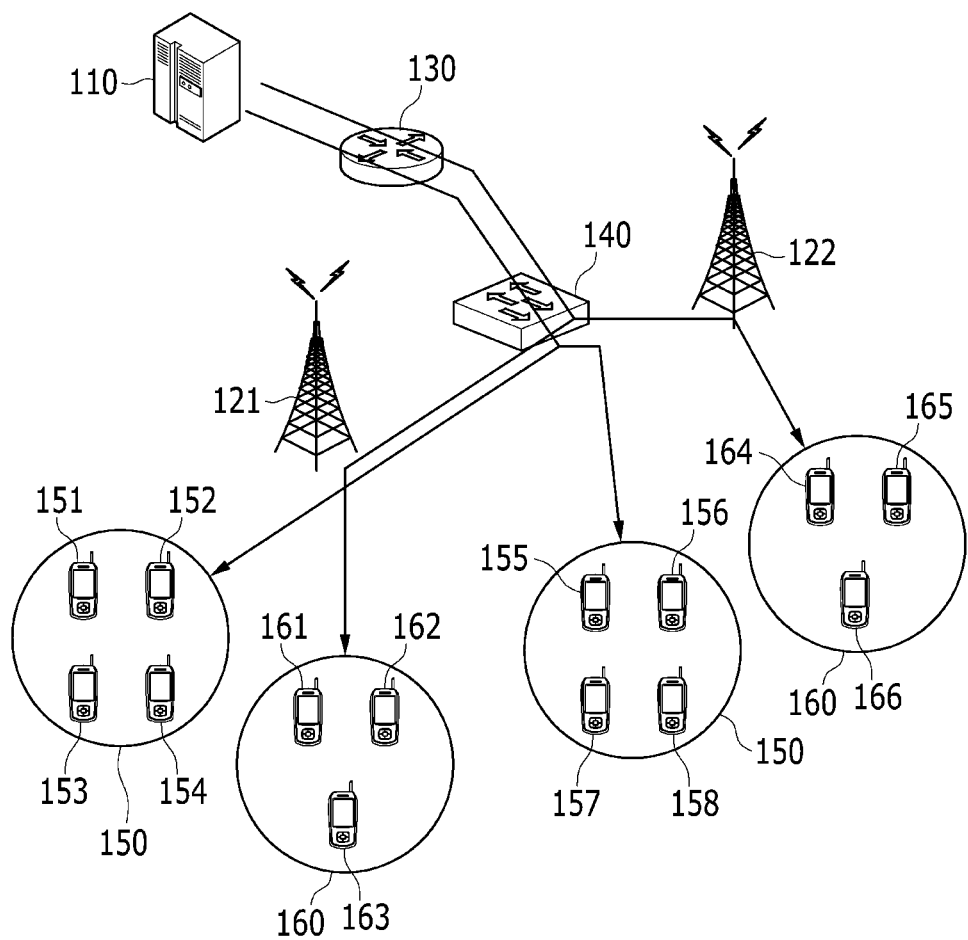
FIG. 1 shows a communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), a mobile station (MS), a subscriber station (SS), a portable subscriber station (PSS), an access terminal (AT), and user equipment (UE), and it may include entire or partial functions of the MT, the MS, the SS, the PSS, the AT, and the UE.

In the specification, a base station (BS) may indicate a node B, an evolved node B (eNodeB), an access point (AP), a radio access station (RAS), a base transceiver station (BTS), a mobile multihop relay (MMR)-BS, a relay station (RS) serving as a base station, and a high reliability relay station serving as a base station, and it may include entire or partial functions of the node B, the eNodeB, the AP, the RAS, the BTS, the MMR-BS, the RS, and the HR-RS.

FIG. 1 shows a communication system according to an embodiment of the present invention.

The communication system according to an embodiment of the present invention is used for a group call. For the group call, a call is made between a plurality of users, and the same traffic is transmitted within users in a group. Traffic is transmitted to the user group through at least one infrastructure station. A base station and a relay station may be used as the infrastructure station, and the base station will exemplified as the infrastructure station below. Schemes for transmitting traffic from a base station to users in the same group may be classified into two schemes. One scheme is a scheme for establishing a connection for each user and transmitting traffic to each user connection. Although this scheme has the merit of using each user connection, the required number of user connections increases in proportion to the number of users in the base station. That is, this scheme results in inefficient use of wireless resources because the same traffic is transmitted using individual connections. Another scheme is a scheme for establishing a multicast connection for a user group and establishing this connection for users in the group belonging to one base station. The users in the group receive traffic transmitted through the multicast connection.

Referring to FIG. 1, for a group call, traffic is multicasted from an upper layer entity, such as a PTT server 110, to at least one of base stations 121 and 122. The PTT server 110 may be connected to the base stations 121 and 122 via a router 130 and a control station 140. The base stations 121 and 122 establish a multicast connection in a wireless access interval, and transmit traffic to terminals 151 to 154 and 155 to 158, which belong to their respective coverage areas, of a user group 150 in the multicast. In addition, if another user group 160 exists, the base stations 121 and 122 transmit traffic to terminals 161 to 164 and 165 to 166, which belong to their respective coverage areas, of the user group 160 in the multicast.

As such, according to an embodiment of the present invention, the group call can be performed in zones other than an MBS zone because terminals belonging to the same group can receive traffic in the multicast.

Next, a method for identifying a user group for multicast transmission or a user group connection will be described with reference to FIGS. 2 and 3.

Figure 2:
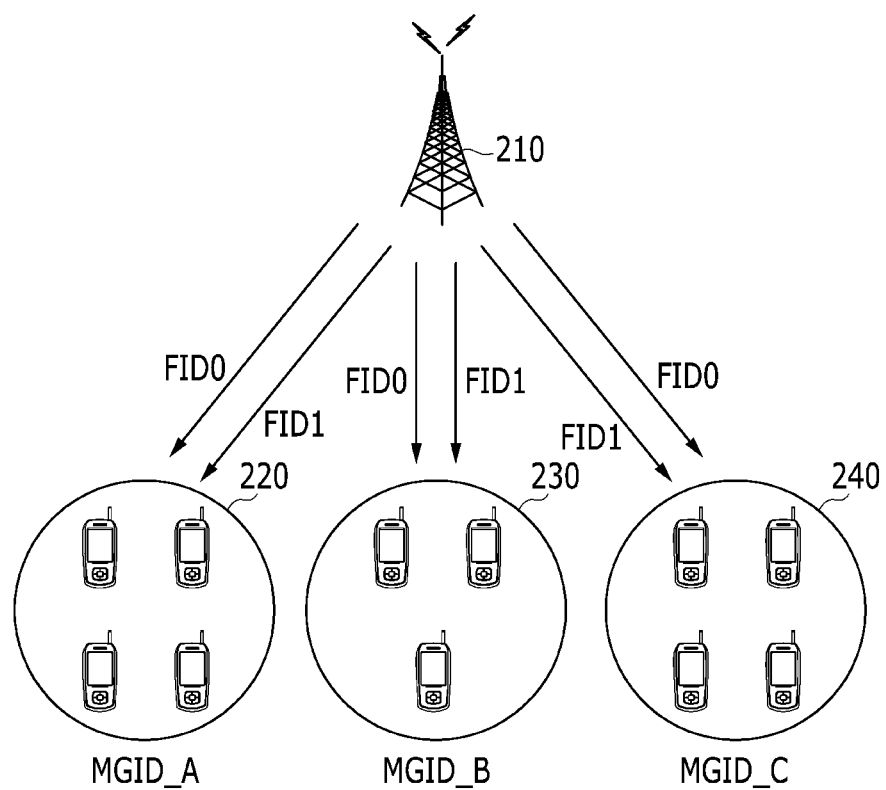
FIG. 2 shows a method for identifying a multicast group according to an embodiment of the present invention.

FIG. 2 shows a method for identifying a multicast group according to an embodiment of the present invention.

Referring to FIG. 2, a base station 210 assigns the same identifier MGID_A, MGID_B, or MGID_C to the same user group, i.e., multicast groups 220, 230, or 240, for multicast transmission. The identifier is called a multicast group identifier (MGID). The MGID is uniquely allocated in a medium access control (MAC) layer of the base station 210, and has a limited size. The MGID is used as an identifier for informing the corresponding multicast group about allocated resources. The MGID is used in an information element (IE), for example, a MAP IE, of a downlink control structure for transmitting resource allocation information, so that information can be transmitted to each multicast group. According to another embodiment, the MGID may be assigned by an upper layer entity of the base station 210, e.g., a PTT server (110 of FIG. 1). According to another embodiment, an MGID may be pre-assigned to a terminal by a predefined scheme.

In addition to the MGID, the base station 210 uses a flow identifier (FID) for identifying a connection. The FID is defined in the MAC layer, and, for example, may be contained in an advanced generic MAC header (AGMH) defined in IEEE 802.16m. The base station 210 allocates an FID (FID0 or FID1) to each MGID so that a connection can be uniquely identified within the MGID. The FID is a unique identifier for identifying a signal or traffic connection in the MGID, and therefore a specific connection for a multicast group is identified by an identifier consisting of a combination of the MGID and the FID in the base station 210.

According to another embodiment, an FID may be pre-assigned to a terminal by a predefined scheme.

Figure 3:
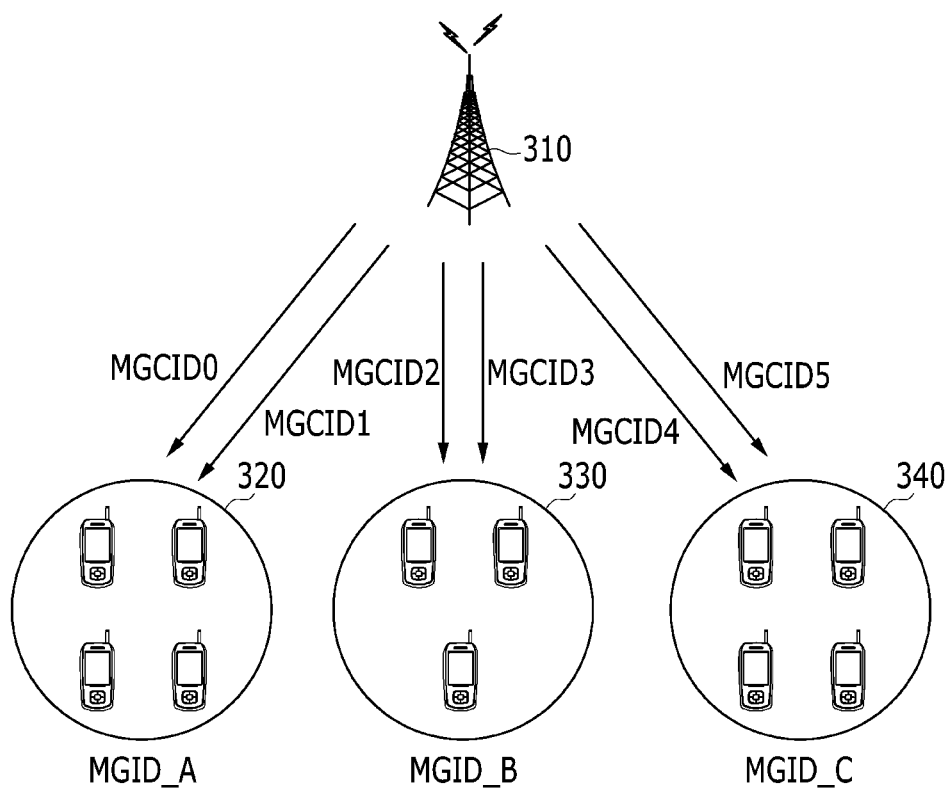
FIG. 3 shows a method for identifying a multicast group connection according to another embodiment of the present invention.

FIG. 3 shows a method for identifying a multicast group connection according to another embodiment of the present invention.

Referring to FIG. 3, a base station 310 assigns an identifier for each connection of a multicast group 320, 330, or 340. The identifier is called a multicast group connection identifier (MGCID). The MGCID is uniquely allocated to identify a connection in the MAC layer of the base station 310, and has a limited size. In an example of FIG. 3, MGCID0 and MGCID1 are respectively allocated to two multicast group connections of the multicast group 320, MGCID2 and MGCID3 are respectively allocated to two multicast group connections of the multicast group 330, and MGCID4 and MGCID5 are respectively allocated to two multicast group connections of the multicast group 340. According to another embodiment, an MGCID may be assigned by an upper layer entity of the base station 310, e.g., a PTT server, or may be assigned by a predefined scheme.

A multicast group connection is a connection shared by a user group, i.e., a multicast group, and is uniquely identified by an MGCID within a base station. The multicast group may be informed about resources allocated for the multicast group connection through the MGCID. In this case, differently from FIG. 2, no FID is used to identify the multicast group connection. Therefore, an FID defined in the AGMH of IEEE 802.16m may be diverted to other purposes. Alternatively, a field corresponding to the FID may be deleted from the AGMH to define an AGMH that is reduced in size.

Figure 4:
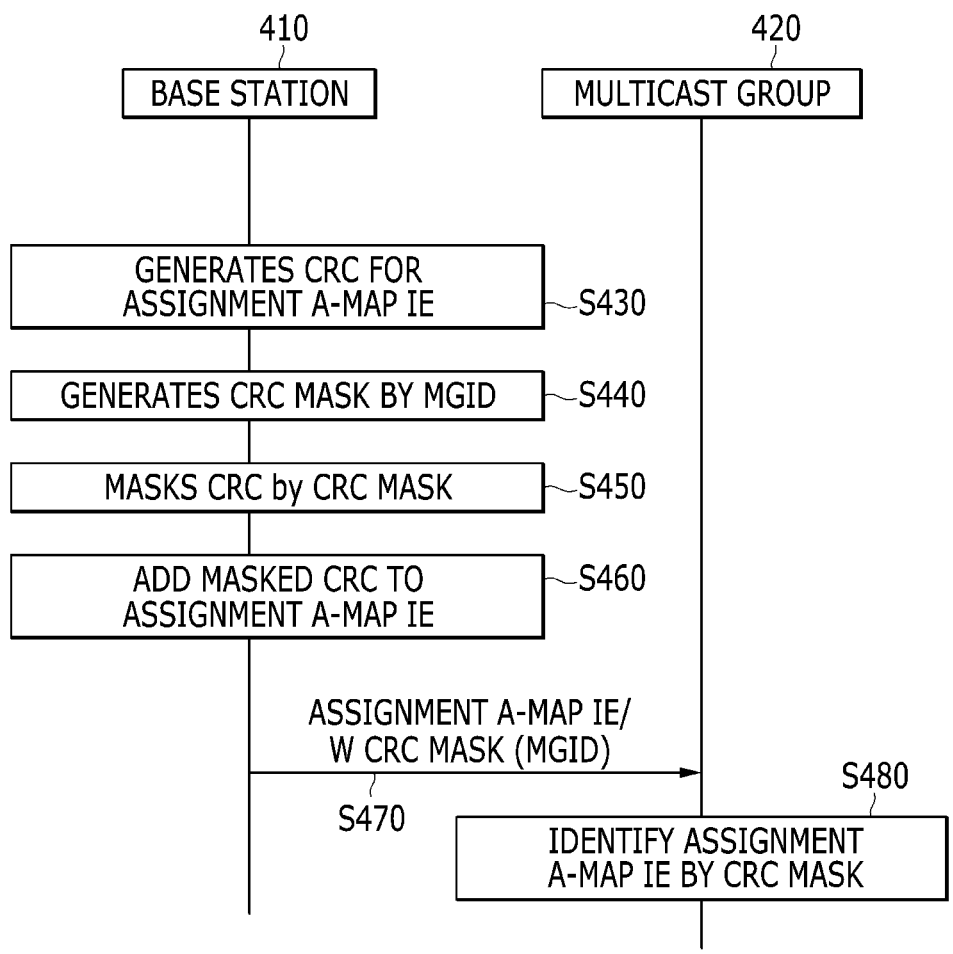
FIG. 4 shows a method for setting a CRC mask for a multicast group according to an embodiment of the present invention.

FIG. 4 shows a method for setting a cyclic redundancy check (CRC) mask for a multicast group according to an embodiment of the present invention.

Referring to FIG. 4, a base station 410 transmits resource allocation information to a terminal via a MAP IE of a MAP. For example, an assignment advanced MAP (A-MAP) may be used as the MAP. The assignment A-MAP is categorized into several types of assignment A-MAP IEs. The base station 410 generates a CRC for each assignment A-MAP IE (S430), and masks the generated CRC by a CRC mask (S450). Next, the base station 410 adds the masked CRC to the assignment A-MAP IE, and then transmits the assignment A-MAP IE to a multicast group 420 (S470). For example, the base station 410 generates a 16-bit CRC, and masks the CRC by performing a bitwise exclusive OR (XOR) operation on the generated CRC and the 16-bit CRC. Each terminal 421 of the multicast group 420 identifies an assignment A-MAP IE by a CRC mask (S480).

When transmitting the assignment A-MAP IE to the multicast group 420, the base station 410 generates a CRC mask by an MGID (S440). The CRC mask may include a masking prefix and remaining bits. If a length of the CRC mask is 16 bits, it may include a 1-bit masking prefix and the remaining 15 bits. If the masking prefix has a predetermined value, e.g., 0 (i.e., "0b0"), the remaining bits may include a message type indicator and a masking code. If a length of the remaining bits is 15 bits, the message type indicator and the masking code may have lengths of 3 bits and 12 bits, respectively. In the case of the assignment A-MAP IE transmitted to the multicast group, the remaining bits may include a masking code including an MGID and a message type indicator having a specific value. For example, a 3-bit message type indicator may be set to "0b010", and the masking code may be set to MGID. If the MGID is greater than 12 bits, the masking code may be set to the least significant 12 bits of the MGID (i.e., the 12-bit least significant bits (LSB)).

In another embodiment, the bits of the MGID may be divided to use some of the bits for the message type indicator and the other bits for the masking code. For example, if the length of the MGID is 13 bits, the LSB 12 bits may be used for the masking code, and the most significant 1 bit (i.e., the MSB 1 bit) for the message type indicator.

In another embodiment, when the assignment A-MAP IE is transmitted to a multicast group connection, the MGID used in the above-described method may be replaced with an MGCID to generate a CRC mask. The MGCID may be a combination of the MGID and an FID as described with reference to FIG. 2, or an individually assigned identifier as described with reference to FIG. 3.

As such, according to the embodiment described with reference to FIG. 2 to FIG. 4, a multicast group or multicast group connection can be identified by a CRC mask generated using a unique MGID or MGCID in the MAC layer. As a result, resources can be allocated for each multicast group or each multicast group connection.

Next, the assignment A-MAP IE for a multicast group will be described with reference to Table 1 to Table 3.

According to an embodiment of the present invention, a base station uses a MAP IE defined for unicast transmission to implement multicast transmission. For example, the base station re-uses assignment A-MAP IEs, such as downlink (DL) Basic Assignment A-MAP IE, DL Sub-band Assignment A-MAP IE, DL Persistent Allocation A-MAP IE, Group Resource Allocation A-MAP IE, and etc. The reuse of the assignment A-MAP IE means that the syntax and size of the fields of a conventional assignment A-MAP IE are equal. Also, in order to correlate information included in each assignment A-MAP IE with a multicast group or multicast group connection, the base station uses an MGID or MGCID for a CRC mask as described above.

The base station may transmit information about resources allocated for a multicast group or multicast group connection through the DL basic assignment A-MAP IE. A terminal identifies the DL basic assignment A-MAP IE by the CRC mask. The DL basic assignment A-MAP IE may be defined in Table 1. Each field may have the same meaning as the fields defined, for example, in IEEE 802.16m.

TABLE 1

| Syntax | Size (bit) | Description/Notes |
| --- | --- | --- |
| Multicast_DL_Basic_Assignment_ A-MAP_IE( ) { | | |
| A-MAP IE Type | 4 | Multicast DL Basic Assignment A-MAP IE |
| ISizeOffset | 5 | Offset used to compute burst size index |
| MEF | 2 | MIMO encoder format<br>0b00: SFBC<br>0b01: Vertical encoding<br>0b10: Multi-layer encoding<br>0b11: CDR |
| if (MEF == 0b01){ | | Parameters for vertical encoding |
| Mt | 3 | Number of streams in transmission<br>Nt: Number of transmit antennas at the ABS<br>0b000: 1 stream<br>0b001: 2 streams<br>0b010: 3 streams<br>0b011: 4 streams<br>0b100: 5 streams<br>0b101: 6 streams<br>0b110: 7 streams<br>0b111: 8 streams |
| Reserved | 2 | Reserved bit |
| } else if(MEF == 0b10) { | | Parameters for multi-layer encoding |
| Si | 5 | Index used to identify the combination of the number of streams and the allocated pilot stream index (PSI) in a transmission with MU-MIMO and the modulation constellation of paired user in the case of 2 stream transmission<br>0b00000: 2 streams with PSI=stream0 and other modulation =QPSK<br>0b00001: 2 streams with PSI=stream0 and other modulation =16QAM<br>0b00010: 2 streams with PSI=stream0 and other modulation =64QAM<br>0b00011: 2 streams with PSI=stream0 and other modulation information not available<br>0b00100: 2 streams with PSI=stream1 and other modulation =QPSK<br>0b00101: 2 streams with PSI=stream1 and other modulation =16QAM<br>0b00110: 2 streams with PSI=stream1 and other modulation =64QAM<br>0b00111: 2 streams with PSI=stream1 and other modulation information not available<br>0b01000: 3 streams with PSI=stream0<br>0b01001: 3 streams with PSI=stream1<br>0b01010: 3 streams with PSI=stream2<br>0b01011: 4 streams with PSI=stream0<br>0b01100: 4 streams with PSI=stream1<br>0b01101: 4 streams with PSI=stream2<br>0b01110: 4 streams with PSI=stream3<br>0b01111: 3 streams with PSI=stream0 and stream1<br>0b10000: 4 streams with PSI=stream0 and stream1<br>0b10001: 4 streams with PSI=stream2 and stream3<br>0b10010-0b11111: n/a |
| }else{ | | |
| Reserved | 5 | Reserved bits |
| } | | |
| Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size. |
| Long TTI Indicator | 1 | Indicates number of AAI subframes spanned by the allocated resource.<br>0b0: 1 AAI subframe (default)<br>0b1: 4 DL AAI subframes for FDD or all DL AAI subframes for TDD |
| Reserved | 12 | Reserved bits |
| } | | |

The base station may transmit information about sub-band resources allocated for a multicast group or multicast group connection through the DL sub-band allocation A-MAP IE. The terminal identifies the DL sub-band allocation A-MAP IE by the CRC mask. The DL sub-band allocation A-MAP IE may be defined as in Table 1, except for the A-MAP IE Type field. That is, the A-MAP IE Type field may have a different value from that in Table 1, that is, a value indicating a multicast DL sub-band allocation A-MAP IE.

The base station may transmit information about persistent resources allocated for a multicast group or multicast group connection through the DL persistent allocation A-MAP IE. The terminal identifies the DL persistent allocation A-MAP IE by the CRC mask. The DL persistent allocation A-MAP IE may be defined as in Table 2. Each field may have the same meaning as the fields defined, for example, in IEEE 802.16m.

TABLE 2

| Syntax | Size (bit) | Description/Notes |
|---|---|---|
| Multicast DL Persistent Allocation A-MAP_IE( ) { | — | — |
| A-MAP IE Type | 4 | Multicast DL Persistent Allocation A-MAP IE |
| Allocation Period | 2 | Period of persistent allocation. If (Allocation Period==0b00), it indicates the deallocation of a persistently allocated resource.<br>0b00: deallocation<br>0b01: 2 frames<br>0b10: 4 frames<br>0b11: 8 frames |
| if (Allocation Period==0b00){ | — | — |
| Resource Index | 11 | Confirmation of the resource index for a previously assigned persistent resource that has been deallocated<br>5 MHz: 0 in first 2 MSB bits + 9 bits for resource index<br>10 MHz: 11 bits for resource index<br>20 MHz: 11 bits for resource index<br>Resource index includes location and allocation size |
| Long TTI Indicator | 1 | Indicates number of AAI subframes spanned by the allocated resource.<br>0b0: 1 AAI subframe (default)<br>0b1: 4 DL AAI subframes for FDD or all DL AAI subframes for TDD |
| Reserved | 22 | Reserved bits |
| } else if (Allocation Period != 0b00){ | — | — |
| ISizeOffset | 5 | Offset used to compute burst size index |
| MEF | 2 | MIMO encoder format<br>0b00: SFBC<br>0b01: Vertical encoding<br>0b10: Multi-layer encoding<br>0b11: CDR |
| if (MEF == 0b01){ | | Parameters for vertical encoding |
| Mt | 3 | Number of streams in transmission<br>Nt: Number of transmit antennas at the ABS<br>0b000: 1 stream<br>0b001: 2 streams<br>0b010: 3 streams<br>0b011: 4 streams<br>0b100: 5 streams<br>0b101: 6 streams<br>ob110: 7 streams<br>0b111: 8 streams |
| Reserved | 1 | |
| } else if(MEF == 0b10){ | | Parameters for multi-layer encoding |
| Si | 4 | Index to identify the combination of the number of streams and the allocated pilot stream index in a transmission with MU-MIMO and the modulation constellation of paired user in the case of 2 stream transmission<br>0b0000: 2 streams with PSI=stream1 and other modulation =QPSK<br>0b0001: 2 streams with PSI=stream1 and other modulation =16QAM<br>0b0010: 2 streams with PSI=stream1 and other modulation =64QAM<br>0b0011: 2 streams with PSI=stream1 and other modulation information not available<br>0b0100: 2 streams with PSI=stream2 and other modulation =QPSK<br>0b0101: 2 streams with PSI=stream2 and other modulation =16QAM<br>0b0110: 2 streams with PSI=stream2 and other |

TABLE 2-continued

| Syntax | Size (bit) | Description/Notes |
|---|---|---|
| | | modulation =64QAM |
| | | 0b0111: 2 streams with PSI=stream2 and other modulation information not available |
| | | 0b1000: 3 streams with PSI=stream1 |
| | | 0b1001: 3 streams with PSI=stream2 |
| | | 0b1010: 3 streams with PSI=stream3 |
| | | 0b1011: 4 streams with PSI=stream1 |
| | | 0b1100: 4 stream with PSI=stream2 |
| | | 0b1101: 4 streams with PSI=stream3 |
| | | 0b1110: 4 streams with PSI=stream4 |
| | | 0b1111: n/a |
| } | — | — |
| Resource Index | 11 | 5 MHz: 0 in first 2 MSB bits + 9 bits for resource index |
| | | 10 MHz: 11 bits for resource index |
| | | 20 MHz: 11 bits for resource index |
| | | Resource index includes location and allocation size |
| LongTTI Indicator | 1 | Indicates number of AAI subframes spanned by the allocated resource. |
| | | 0b0: 1 AAI subframe (default) |
| | | 0b1: 4 DL AAI subframes for FDD or all DL AAI subframes for TDD |
| Reserved | 11 | Reserved bits |
| } | — | — |
| } | — | — |

The base station may transmit information about resources allocated for a plurality of multicast groups or multicast group connections through the group resource allocation A-MAP IE. The terminal identifies the group resource allocation A-MAP IE by the CRC mask. The group resource allocation A-MAP IE may be defined as in Table 3. Each field may have the same meaning as the fields defined, for example, in IEEE 802.16m.

Next, a method for managing a multicast group connection according to an embodiment of the present invention will be described with reference to FIGS. 5 and 6.

Figure 5:
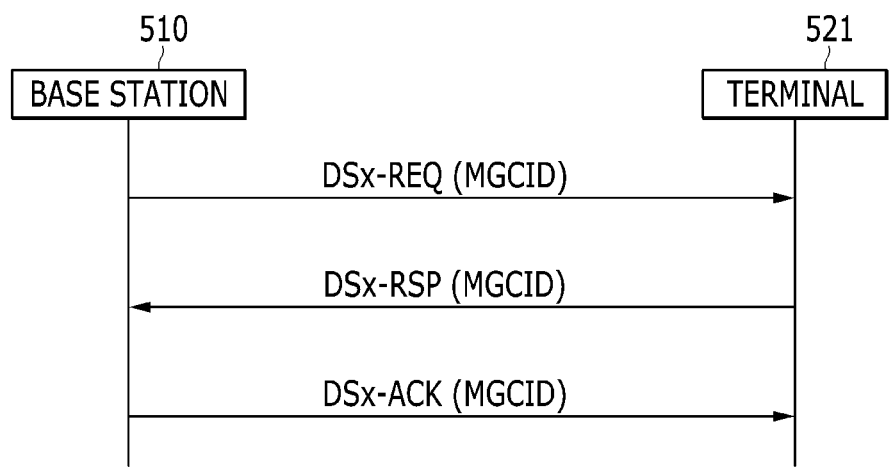
FIG. 5 and FIG. 6 are signal flowcharts showing a method for managing a multicast group connection according to an embodiment of the present invention.
Figure 6:
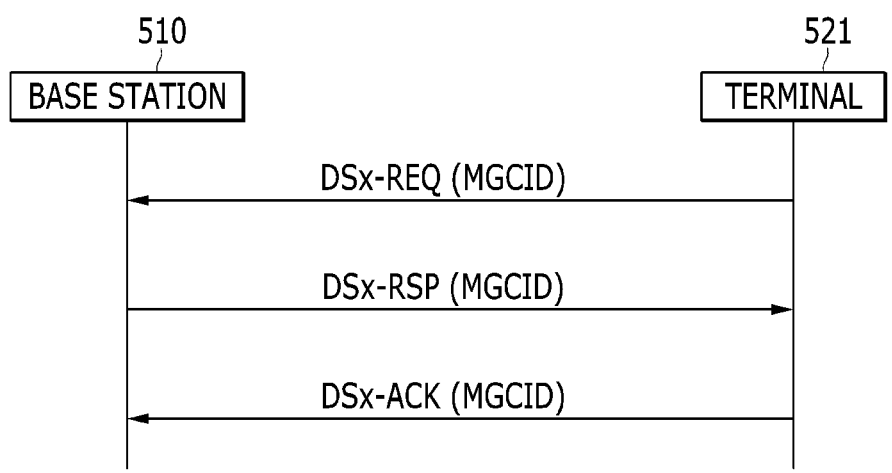

FIG. 5 and FIG. 6 are signal flowcharts showing a method for managing a multicast group connection according to an embodiment of the present invention.

Referring to FIG. 5, a base station 510 uses unicast transmission in order to manage a multicast group connection for

TABLE 3

| Syntax | Size (bit) | Description/Notes |
|---|---|---|
| Group_Resource_Allocation_A-MAP_IE( ) { | — | — |
| A-MAP IE Type | 4 | Group Resource Allocation A-MAP IE |
| if (UL Allocation && D <U){ | | If group corresponds to UL allocations and the number of DL AAI subframes (D) is less than the number of UL AAI subframes (U) |
| Allocation Relevance | 1 | 0b0: Allocation in the first UL subframe relevant to an A-MAP region |
| | | 0b1 : Allocation in the second UL subframe relevant to an A-MAP region |
| } | | |
| User Bitmap | Variable | Bitmap to indicate scheduled AMSs in a group. The size of the bitmap is equal to the User Bitmap Size signaled to each AMS in the Group configuration MAC control message. |
| | | 0b0: AMS not allocated in this AAI subframe |
| | | 0b1: AMS allocated in this AAI subframe |
| Resource Offset | 7 | Indicates starting LRU for resource assignment to this group |
| HFA Offset | 6 | Indicates the start of the HARQ feedback channel index used for scheduled allocations. |
| if( Group MIMO mode set ==0b01){ | | |
| MIMO Bitmap | Variable | Bitmap to indicate MIMO mode for the scheduled AMSs. |
| | | 0b0: Mode 0 |
| | | 0b1: Mode 1 |
| } | | |
| Resource Assignment Bitmap | Variable | Bitmap to indicate burst size/resource size for each scheduled AMS |
| } | — | — | a user group. That is, the base station 510 exchanges signals for managing the multicast group connection with each terminal 521 in the user group. Managing the multicast group connection includes at least one of adding the multicast group connection, changing the multicast group connection, and deleting the multicast group connection. For example, the base station 510 may manage the multicast group connection by using a DSx signaling procedure for flow management. In the DSx signaling procedure, the base station 510 transmits a DSx request (DSx-REQ) message to each terminal 521 of the user group, the terminal 521 transmits a DSx response (DSx-RSP) message to the base station 510 in response to the DSx-REQ message, and the base station 510 transmits a DSx acknowledgement (DSx-ACK) message to the terminal 521 in acknowledgment of the reception of a DSx-RSP message. The DSx message includes a dynamic service addition (DSA) message, a dynamic service change (DSC) message, and a dynamic service delete (DSD) message.

The base station 510 may add an MGCID field to each DSx message, i.e., each of the DSx-REQ, DSx-RSP, and DSx-ACK messages, to indicate that the DSx message is a message used to manage the multicast group connection corresponding to the MGCID.

According to another embodiment, differently from FIG. 5, the terminal 521 may initiate multicast group connection management. As shown in FIG. 6, the terminal 521 may initiate multicast group connection management by transmitting a DSx-REQ message to the base station 510. In response to the DSx-REQ message, the base station 510 transmits a DSx-RSP message to the terminal 521, and the terminal 521 transmits a DSx-ACK message to the base station 510.

According to another embodiment, a multicast group and a flow, i.e., connection, within the corresponding multicast group may be managed by an MGID and an FID instead of an MGCID. That is, each DSx message containing an FID field may further include an MGID field to identify a multicast group. Accordingly, the base station 510 and the terminal 521 identify a multicast group by the MGID, and identify a flow by the FID. The DSA message is used to allocate the multicast group and add the flow within the multicast group in the case that no multicast group is allocated. Also, the DSD message is used to delete the multicast group indicated by the MGID from the terminal 521. In this case, the FID may have a value of 0 because there is no need to identify the flow.

Hence, according to the embodiment described with reference to FIG. 5 and FIG. 6, a multicast group connection may be defined through a unicast DSx signaling procedure to provide a connection to a terminal of a multicast group.

Next, a method for managing a multicast group according to an embodiment of the present invention will be described with reference to FIG. 7 and FIG. 8.

Figure 7:
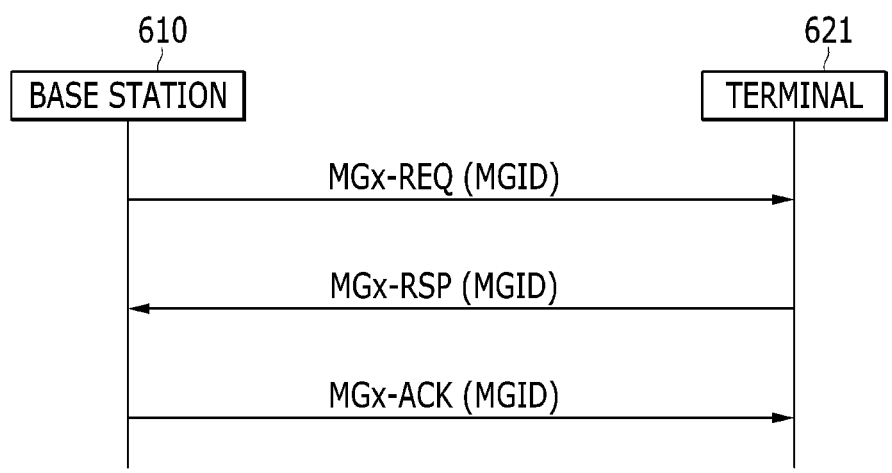
FIG. 7 and FIG. 8 are signal flowcharts showing a method for managing a multicast group according to an embodiment of the present invention.
Figure 8:
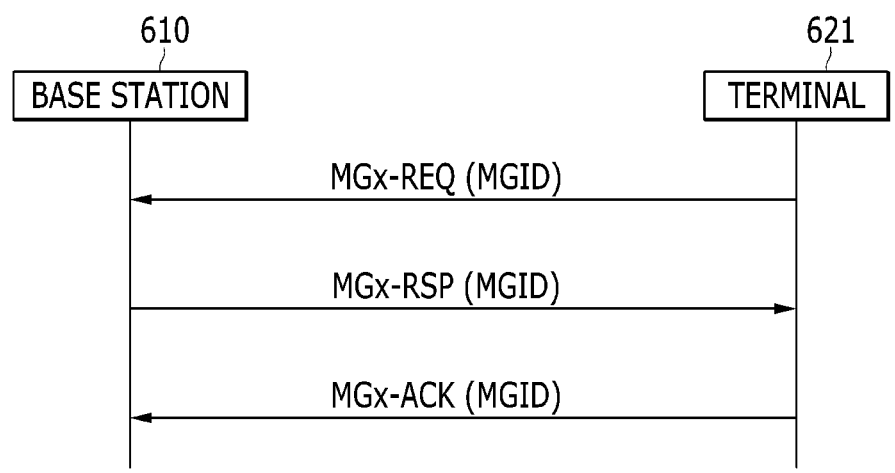

FIG. 7 and FIG. 8 are signal flowcharts showing a method for managing a multicast group according to an embodiment of the present invention.

Referring to FIG. 7, a base station 610 uses unicast transmission in order to manage a multicast group for a user group. That is, the base station 610 exchanges signals for managing a multicast group connection with each terminal 621 in the user group. Managing the multicast group includes at least one of adding the multicast group, changing the multicast group, and deleting the multicast group.

When adding the multicast group to the terminal 621, the base station 610 transmits a multicast group addition request (MGA-REQ) message to the terminal 621, the terminal 621 transmits an MGA response (MGA-RSP) message to the base station 610 in response to the MGA-REQ message, and the base station 610 transmits an MGA acknowledgement (MGA-ACK) message to the terminal 621 in acknowledgment of the reception of an MGA-RSP message. When changing the multicast group, the base station 610 transmits a multicast group change request (MGC-REQ) message to the terminal 621, the terminal 621 transmits an MGC response (MGC-RSP) message to the base station 610 in response to the MGC-REQ message, and the base station 610 transmits an MGC acknowledgement (MGC-ACK) message to the terminal 621 in acknowledgment of the reception of an MGC-RSP message. When deleting the multicast group, the base station transmits a multicast group delete request (MGD-REQ) message to the terminal 621, the terminal 621 transmits an MGD response (MGD-RSP) message to the base station 610 in response to the MGD-REQ message, and the base station 610 transmits an MGD acknowledgement (MGD-ACK) message to the terminal 621 in acknowledgment of the reception of an MGD-RSP message. The MGA, MGC, and MGD may be represented by MGx.

In this case, the base station 610 may add an MGID field to each MGx message, i.e., each of the MGx-REQ, MGx-RSP, and MGx-ACK messages, to indicate that the MGx message is a message used to manage the multicast group corresponding to the MG ID.

According to another embodiment, the MGx-ACK message may be omitted in the signaling procedure.

According to another embodiment, differently from FIG. 7, the terminal 621 may initiate multicast group connection management. As shown in FIG. 8, the terminal 621 may initiate the multicast group connection management by transmitting an MSx-REQ message to the base station 610. Then, the base station 610 transmits an MGx-RSP message to the terminal 621, and the terminal 621 transmits an MGx-ACK message to the base station 610.

After allocating a multicast group by multicast group management, the base station 610 may use unicast transmission in order to manage a flow within the multicast group, i.e., a multicast group connection. A DSx signaling procedure may be used as a unicast signaling method. An MGID field is added to each DSx message. Moreover, an FID for identifying a flow connection is set in the multicast group.

Then, the terminal 621 receives a MAP, e.g., an assignment A-MAP, by using a CRC mask generated by an MGID, and receives a burst based on allocated resource information identified through the MAP. The terminal 621 identifies a flow by using the FID included in the header, e.g., AGMH, of the received burst.

To provide efficiency, a multicast group and a flow may be managed with a DSx message, as described above, without the procedure of allocating the multicast group.

Hence, according to the embodiment described with reference to FIG. 7 and FIG. 8, a unicast MGx signaling procedure may be used to allocate a multicast group to a terminal or change or delete a multicast group of a terminal.

Next, a method for managing a flow in a multicast group according to another embodiment of the present invention will be described with reference to FIG. 9.

Figure 9:
FIG. 9 is a signal flowchart showing a method for managing a flow in a multicast group according to another embodiment of the present invention.

FIG. 9 is a signal flowchart showing a method for managing a flow in a multicast group according to another embodiment of the present invention.

Referring to FIG. 9, after a multicast group is allocated to a user group 720, a base station 710 transmits a flow management message, e.g., a DSx command (DSx-CMD) message, to the user group 720 in multicast. The DSx-CMD message includes a DSA command (DSA-CMD) message for adding a flow to the user group 720, a DSD-CMD message for changing the flow in the user group 720, and a DSC-CMD message for deleting the flow from the user group 720. The DSx-CMD message has an FID field, and manages a flow corresponding to the FID.

The DSx-CMD message transmitted in the multicast may be transmitted through resources allocated to an MGID of the corresponding multicast group. In this case, the DSx-CMD message may include no MGID.

If the FID included in the DSD-CMD message is an identifier of a flow in which a signal message, e.g., the DSD-CMD message, is transmitted, the multicast group may be deleted by the DSD-CDM message.

As such, according to the embodiment described with reference to FIG. 9, a flow within the multicast group can be managed through a multicast-based DSx-CMD message, thereby increasing the efficiency of signal transmission.

Next, a multicast management apparatus according to an embodiment of the present invention will be described with reference to FIG. 10 and FIG. 11.

Figure 10:
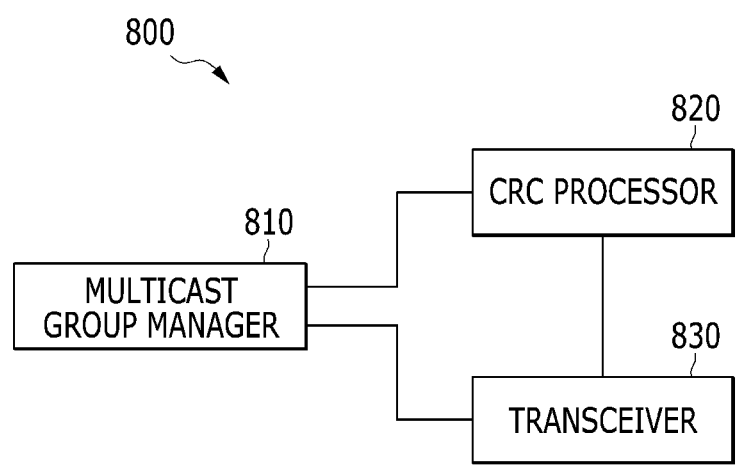
FIG. 10 is a block diagram showing a multicast management apparatus of a base station according to an embodiment of the present invention.

FIG. 10 is a block diagram showing a multicast management apparatus of a base station according to an embodiment of the present invention. FIG. 11 is a block diagram showing a multicast management apparatus of a terminal according to an embodiment of the present invention.

Referring to FIG. 10, a multicast management apparatus 800 of a base station includes a multicast group manager 810, a CRC processor 820, and a transceiver 830.

The multicast group manager 810 manages a multicast group or multicast group connection to which each terminal belongs, and generates an MGID or MGCID or manages the MGID or MGCID received from an upper layer entity. Moreover, the multicast group manager 810 allocates resources to a multicast group or multicast group connection, and manages the resources.

The CRC processor 820 generates a CRC corresponding to resource allocation information of the multicast group or multicast group connection, uses the MGID or MGCID to generate a CRC mask, and masks the CRC by the CRC mask.

The transceiver 830 performs a DSx signaling procedure with each terminal of the multicast group to manage the multicast group connection, or performs an MGx signaling procedure with each terminal of the multicast group to manage the multicast group. Alternatively, the transceiver 830 transmits a DSx-CMD message to the multicast group to manage a flow within the multicast group. Moreover, the transceiver 830 transmits, to each terminal, a MAP (assignment A-MAP) to which the CRC masked by the CRC mask is added.

Figure 11:
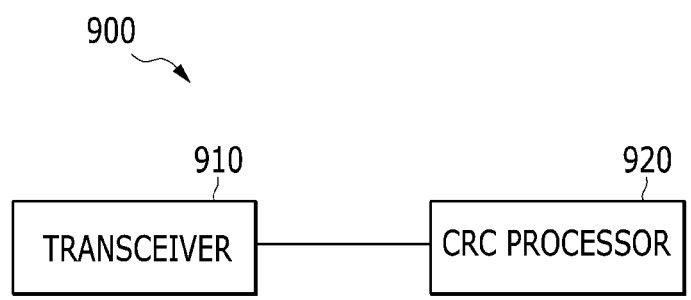
FIG. 11 is a block diagram showing a multicast management apparatus of a terminal according to an embodiment of the present invention.

Referring to FIG. 11, a multicast management apparatus 900 of a terminal includes a transceiver 910 and a CRC processor 920.

The transceiver 910 performs a DSx signaling procedure with a terminal to manage a multicast group connection to which a terminal belongs, or performs an MGx signaling procedure with the base station to manage a multicast group. Alternatively, the transceiver 910 receives a DSx-CMD message from the base station to manage a flow within the multicast group. Moreover, the transceiver 910 receives a MAP (assignment A-MA) transmitted from the base station, and acquires resource allocation information of the multicast group to which the terminal belongs.

The CRC processor 920 generates a CRC mask using an MGID of the multicast group to which the terminal belongs or an MGCID of the multicast group connection. The transceiver 910 uses the CRC mask to identify the MAP transmitted from the base station.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of managing a multicast by a base station, the method comprising:

generating a cyclic redundancy check (CRC) for a message including resource allocation information of a multicast group including a plurality of terminals;

generating a CRC mask using a multicast group connection identifier (MGCID) of the multicast group;

masking the CRC by the CRC mask;

adding the masked CRC to the message; and transmitting the message to which the masked CRC is added to the multicast group;

wherein the MGCID is a combination of a multicast group identifier and a flow identifier for identifying a flow within the multicast group.

2. The method of claim 1, further comprising transmitting a signaling message for managing the multicast group to each terminal of the multicast group in unicast.

3. The method of claim 1, further comprising transmitting a signaling message for managing a flow in the multicast group to the plurality of terminals of the multicast group in multicast.

4. The method of claim 1, further comprising transmitting a signaling message for managing a multicast group connection of the multicast group to each terminal of the multicast group in unicast.

5. A method of managing a multicast by a terminal, the method comprising:

receiving a message including resource allocation information associated with the multicast group to which the terminal belongs; and identifying the message by a CRC mask;

wherein the message includes a CRC masked by the CRC mask;

wherein the resource allocation information is the resource allocation information of a multicast group connection of the multicast group, and the CRC mask is generated by a multicast group connection identifier (MGCID); and wherein the MGCID is a combination of a multicast group identifier and a flow identifier for identifying a flow within the multicast group.

6. A multicast management apparatus comprising:

a multicast group manager configured to manage a multicast group including a plurality of terminals;

a CRC processor configured to mask a CRC for a message including resource allocation information of the multicast group by a CRC mask; and a transceiver configured to transmit the message to which the masked CRC is added to the multicast group;

wherein the CRC processor generates the CRC mask by using a multicast group identifier (MGID); and wherein a portion of bits of the MGID is used for a message type indicator and another portion of the bits of the MGID is used for a masking code.

7. A multicast management apparatus comprising:

a CRC processor configured to process a CRC mask; and a transceiver configured to receive a message including resource allocation information associated with the multicast group to which the terminal belongs from the base station, and to identify the message by the CRC mask;

wherein the CRC mask is generated using a multicast group identifier (MGID); and wherein a portion of bits of the MGID is used for a message type indicator and another portion of the bits of the MGID is used for a masking code.

* * * * *